United States Patent [19]

Derby et al.

[11] 4,229,625

[45] Oct. 21, 1980

[54] REPEATER LEVEL CONTROL CIRCUIT

[75] Inventors: Jeffrey H. Derby, New York, N.Y.; Tadikonda N. Rao, Morris Township, Morris County, N.J.

[73] Assignee: Bell Telephone Laboratories, incorporated, Murray Hill, N.J.

[21] Appl. No.: 974,380

[22] Filed: Dec. 29, 1978

[51] Int. Cl.³ ............................................. H04B 3/38
[52] U.S. Cl. ........................... 179/170 R; 179/170 C; 370/71
[58] Field of Search .............................. 330/134, 295; 179/170 R, 170 C, 170 T, 1 HF, 81 A, 81 B, 170.6, 170.8, 16 F; 370/71, 75, 26

[56] References Cited

U.S. PATENT DOCUMENTS

| | | | |
|---|---|---|---|
| 2,964,598 | 12/1960 | Parker | 179/170.6 |
| 3,603,744 | 9/1971 | Krasin et al. | 179/170.8 |
| 3,689,711 | 9/1972 | Earle et al. | 179/170 R |
| 3,823,273 | 7/1974 | Beeman et al. | 179/81 B |
| 3,893,038 | 7/1975 | Omata et al. | 330/295 |

FOREIGN PATENT DOCUMENTS 2258415  6/1973  Fed. Rep. of Germany ......... 179/81 B Primary Examiner—Raymond F. Cardillo, Jr.
Assistant Examiner—Randall P. Myers
Attorney, Agent, or Firm—Robert O. Nimtz

[57] ABSTRACT

A bilateral transmission line repeater is disclosed in which opposite directions of transmission are separated into different frequency bands. The amplifiers for each direction of transmission include an automatic gain control circuit for controlling the gain of the amplifier. Gain control for the inward bound amplifier (toward a central location such as a telephone central office) is under the control of an automatic gain control signal derived from the outward bound signal as well as from the inward bound signal. Feedback around the gain control amplifier is accomplished using a current mirror circuit to avoid loading the amplifier output.

9 Claims, 1 Drawing Figure

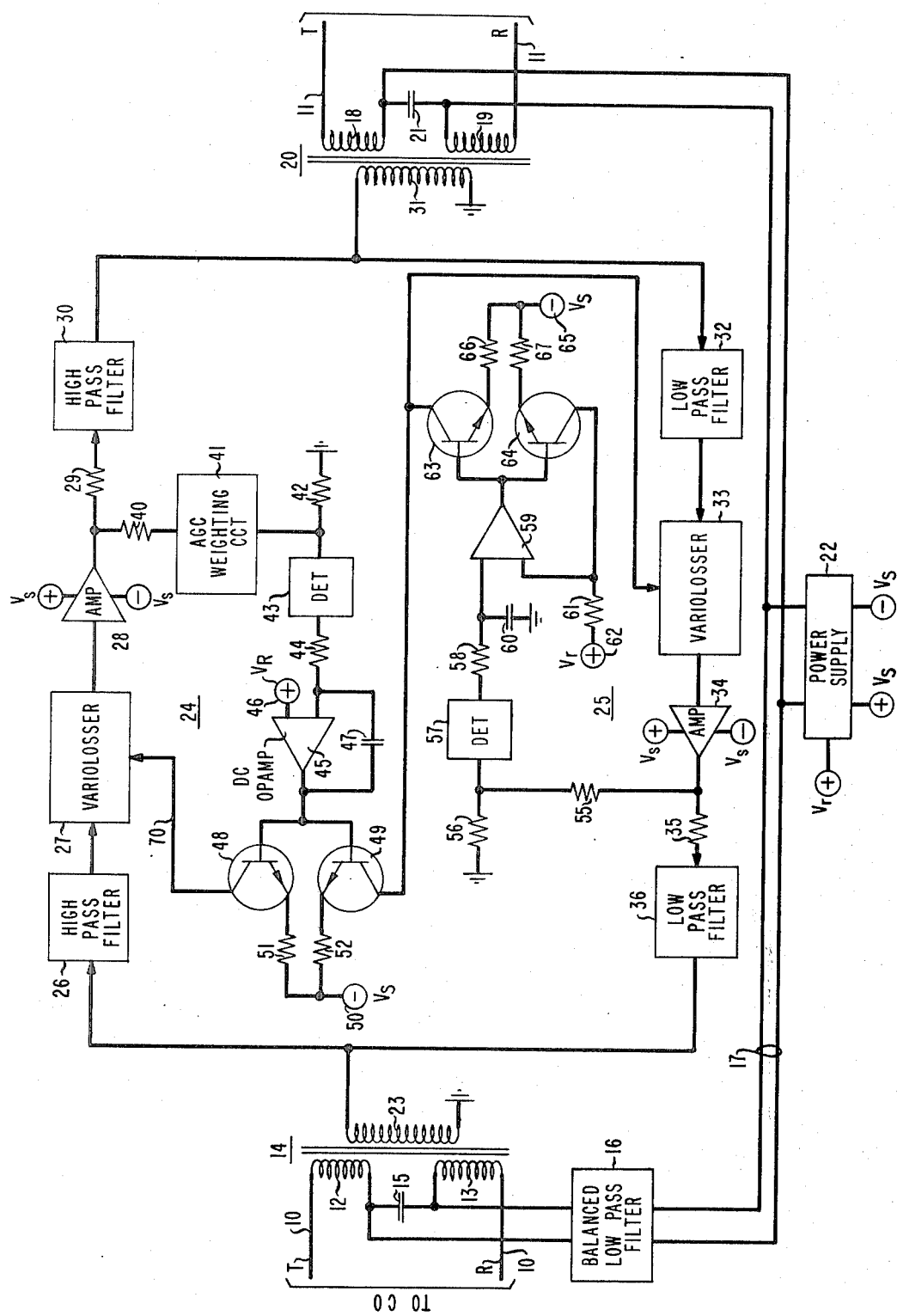

REPEATER LEVEL CONTROL CIRCUIT

BACKGROUND OF THE INVENTION

1. Field of the Invention

This invention relates to bilateral transmission line repeater circuits and, more particularly, to automatic gain control of the amplifiers in such repeaters.

2. Description of the Prior Art

In transmission systems extending over any considerable distance it is necessary to provide gain along the transmission path in the form of repeaters. Such repeaters utilize automatic gain control circuits to control the signal level of the signals launched on the transmission line segments. Such gain control is necessary to provide standard signal levels at the remote receivers and to prevent overload of the repeater amplifiers during operation.

In subscriber loop carrier systems it is known to control the gain of signals inward bound from remote unattended terminals to the central office terminal by the level of the signal transmitted in the outward bound direction. This arrangement, called "cross control," insures that the signal level of the inward bound signal is normally at a desirable design level at the central office receiver. Since a common transmission line is used for signals in both directions, the level of the outward bound signal at the repeater is an excellent measure of the gain required for the inward bound signal.

Although cross-control gain as described above is normally highly desirable and works well for long-term normal conditions, there are cases when the cable temperature changes are extreme and/or the repeaters are unintentionally placed at wrong intervals along the line, and the cross-control feature by itself is not adequate to guarantee that the inward bound amplifier does not overload.

SUMMARY OF THE INVENTION

In accordance with the illustrative embodiment of the present invention, automatic gain control for transmission line repeaters is provided including both desirable cross-control characteristics as well as overload protection characteristics. More specifically, automatic gain control is accomplished by combined control signals for the inward bound amplifier from both the inward bound (towards the central office) and the outward bound (cross control) signal levels. This combined automatic gain control insures a standard signal level during normal signaling conditions and yet is able to respond to abnormal temperature or repeater placement conditions to prevent overload of the outward bound repeater.

BRIEF DESCRIPTION OF THE DRAWING

The single FIGURE of the drawing shows a detailed block diagram of a bilateral repeater utilizing the combined automatic gain control circuits of the present invention.

DETAILED DESCRIPTION

In the drawing there is shown a detailed block diagram of a bilateral repeater connected between an inward bound transmission line 10 and an outward bound transmission line 11. Since the arrangements of the present invention are particularly suitable for use in subscriber loop carrier systems, the transmission lines 10 and 11 are shown as telephone conductor pairs having tip and ring conductors labeled T and R, respectively, in the drawing. Transmission line conductors 10 are connected across the primary windings 12 and 13 of transformer 14.

The repeater of the drawing is energized by direct current electrical power impressed on conductors 10 either at the central office location or at some remote powering station. A capacitor 15 separates windings 12 and 13 for direct currents. The direct current voltage on conductors 10 is applied through a low-pass filter 16 to bypass conductors 17 which connect to outward bound transmission line conductors 11 through windings 18 and 19 of transformer 20. Windings 18 and 19 are separated by a capacitor 21 to maintain the direct current isolation. A local power supply 22 is connected across bypass conductors 17 and translates the direct current supplied on transmission line 10 or 11 to voltage levels suitable for operating the electronic circuits in the balance of the drawing.

The secondary winding 23 of transformer 14 is connected to two transmission paths 24 and 25, one for each direction of transmission. Outward bound transmission path 24 includes a high-pass filter 26 which separates the outward bound signals from the inward bound signals by having a passband which accommodates only the outward bound signal frequency band. The output of filter 26 is applied to a variolosser circuit 27 which attenuates the signal level of signals passing therethrough in response to a control signal on lead 70. The output of variolosser 27 is applied to the input of outward bound amplifier 28 which amplifies the signal and applies it through resistor 29 to a high-pass separation filter 30. The output of filter 30 is connected to the secondary winding 31 of transformer 20.

Winding 31 is likewise connected to both outward bound transmission path 24 and to inward bound transmission path 25. That is, transformer 31 is connected to low-pass separation filter 32 which serves to separate the inward bound carrier frequency band from the outward bound carrier signals by having a passband which discriminates in favor of the lower frequency inward bound carrier signals. The output of filter 32 is applied to a variolosser 33, serving a function for the inward bound path 25 similar to the function of variolosser 27 in the outward bound path 24. The output of variolosser 33 is connected to the input of inward bound amplifier 34, the output of which is applied though resistor 35 to a low-pass separation filter 36.

The output of filter 36 is connected to winding 23 on transformer 14.

It can be seen that the arrangements described above separate the inward and outward bound signals by frequency and separately amplify each of these signals. Both the outward bound and the inward bound signals are subjected to automatic gain control as will be described hereinafter.

Gain control in the outward bound path 24 is obtained by connecting a portion of the output of amplifier 28 through resistor 40 to a weighting circuit 41. Weighting circuit 41 is a frequency dependent impedance which is chosen depending on the frequency characteristics of inward bound transmission line 10. The output of weighting circuit 41, appearing across resistor 42, is applied to a detector 43. Detector 43 rectifies the output from amplifier 28 to supply a rectified gain control signal through resistor 44 to one input of the direct current operational amplifier 45. The other input to operational amplifier 45 is a reference voltage from source 46 which sets a threshold at which the automatic gain control operation takes place. Below this threshold (where the signal from detector 43 is less than the reference signal from source 46) the automatic gain control circuit is inoperative. Feedback capacitor 47 connects the output of operational amplifier 45 to the control input at resistor 44 to provide long-term integration of the rectified control signal, removing the alternating current components. Once amplifier 45 is enabled, the direct current output is maintained at the level of voltage source 46.

The output of operational amplifier 45 is applied simultaneously to the base electrodes of transistors 48 and 49. The emitter electrodes of transistors 48 and 49 are biased from voltage source 50 through biasing resistors 51 and 52, respectively. The collector electrode of transistor 48 is connected to variolosser 27 by way of lead 70 and provides the control signal for varying the attenuation introduced by variolosser 27 in response to the level of the signal transmitted through path 24. This average level feedback in transmission path 24 provides automatic gain control for the outward bound direction of transmission.

The collector electrode of transistor 49 is connected to the control input of variolosser 33 in inward bound transmission path 25. Thus, the average level of the outward bound signal is used to control the level of the inward bound signal by means of a control signal supplied by transistor 49. This control of the inward bound signal by the level of the outward bound signal is called "cross control" and serves the function of establishing an inward bound signal level which is automatically adjusted for the length of the inward bound transmission line 10. This arrangement makes it unnecessary to adjust the gain of amplifier 34 for each repeater installation and thus simplifies the installation of repeater lines and makes the levels received at the central office through a chain of repeaters maintain a predetermined value.

In accordance with the present invention, variolosser 33 is also under the control of the signal level in the inward bound transmission path 25. Thus, the output of amplifier 34 is connected across a voltage divider including resistors 55 and 56. The midpoint of resistors 55 and 56 is connected to a detector 57 similar to detector 43 which provides a rectified control signal through resistor 58 to one input of direct current operational amplifier 59. A capacitor 60 filters the alternating current components from the output of detector 57. The other input to direct current operational amplifier 59 is supplied through resistor 61 from voltage reference source 62. Thus, operational amplifier 59 does not become enabled until the signal on capacitor 60 exceeds the reference voltage supplied from source 62 through resistor 61.

The output of operational amplifier 59 is applied simultaneously to the base electrodes of transistors 63 and 64. The emitter electrodes of transistors 63 and 64 are biased from voltage source 65 through biasing resistors 66 and 67, respectively. The collector of transistor 63, like the collector of transistor 49, is connected to the control input of variolosser 33 and thus contributes to the automatic gain control signal for the inward bound transmission path 25. In this way, the gain of the inward bound transmission path 25 is set at a normal level by the level of the signal in outward bound path 24. Under exceptionally high input signal levels, however, the gain control signal from transistor 63 aids or assists the normal automatic gain control signal to prevent overloading of the components of amplifier 34. In this way, both overload protection and cross control are provided for the inward bound transmission path 25.

The collector of transistor 64 is connected to the reference input of operational amplifier 59. This connection provides negative feedback once amplifier 59 is enabled to control the output current level from transistor 63. This provides a negative feedback action once amplifier 59 produces an output, and establishes the amount of current in the collector of transistor 64 for a given input voltage to amplifier 59.

It will be noted that transistors 63 and 64 comprise a current mirror circuit in that the collector currents of transistors 63 and 64 are identical in magnitude. This arrangement permits the generation of a feedback current identical to the output current from transistor 63 without the necessity of sensing or otherwise loading the output current from transistor 63. The feedback signal derived by the current mirror circuit is therefore independent of any loading effects of variolosser 33 as well as independent of the parameters of any current sensing circuit. This arrangement permits the output of operational amplifier 59 to be controlled extremely accurately without any deleterious loading effects.

We claim:

1. A bilateral repeater for amplifying carrier signals in different frequency bands traveling in opposite directions on a common transmission line, signals in each direction of transmission being separated from signals in the other direction by filters, and a separate carrier amplifier for each direction of transmission characterized by an automatic gain adjusting circuit in at least one direction of transmission connected to said carrier amplifier in the corresponding direction of transmission, means for deriving gain control signals from the outputs of both of said carrier amplifiers, and means for combining said gain control signals to continuously control said gain adjusting circuit.

2. The bilateral repeater according to claim 1 further characterized in that each of said gain control signal deriving means includes a direct current operational amplifier.

3. The bilateral repeater according to claim 2 further characterized in that one of said operational amplifiers includes a capacitive feedback path.

4. The bilateral repeater according to claim 2 further characterized in that one of said operational amplifiers includes a direct current feedback path.

5. A bilateral repeater for carrier systems having a first and a second signal amplification path, said repeater characterized means for generating gain control signals in response to output signals from said first signal amplification path and output signals from said second signal amplification path, and by controlled gain variation means for varying the gain in said second signal amplification path in response to said gain control signals.

6. The bilateral repeater according to claim 5 further characterized in that said controlled gain variation means comprises a variolosser.

7. The bilateral repeater according to claim 5 further characterized in that
   said means for generating gain control signals comprises a direct current operational amplifier responsive to the output signals from said first signal amplification path.

8. The bilateral repeater according to claim 7 further characterized in that
   said operational amplifier includes a reference signal input coupled to the output of said operational amplifier.

9. A bilateral repeater having separate gain controlled amplification circuits for each direction of transmission and including a first control circuit for the gain controlled amplification circuits used for one direction of transmission controlled by gain controlled amplification circuit output signals traveling in the opposite direction characterized by
   a second control circuit for said one direction of transmission,
   said second control circuit being controlled by gain controlled amplification circuit output signals traveling in said one direction of transmission.

* * * * *